United States Patent
Murata et al.

(10) Patent No.: US 9,086,239 B2
(45) Date of Patent: Jul. 21, 2015

(54) AUTOMATED HEAT TREATMENT SYSTEM FOR ENGINE VALVE

(75) Inventors: Yorikazu Murata, Hadano (JP); Yuji Okamura, Hadano (JP); Yosuke Makino, Hadano (JP); Hiroyuki Oda, Hadano (JP)

(73) Assignee: NITTAN VALVE CO., LTD., Hadano-shi (JP)

( * ) Notice: Subject to any disclaimer, the term of this patent is extended or adjusted under 35 U.S.C. 154(b) by 0 days.

(21) Appl. No.: 14/356,017

(22) PCT Filed: Jan. 17, 2012

(86) PCT No.: PCT/JP2012/050803
§ 371 (c)(1),
(2), (4) Date: Jun. 13, 2014

(87) PCT Pub. No.: WO2013/108360
PCT Pub. Date: Jul. 25, 2013

(65) Prior Publication Data
US 2014/0322660 A1    Oct. 30, 2014

(51) Int. Cl.
*F27B 9/14* (2006.01)
*F27B 9/00* (2006.01)
*C21D 9/00* (2006.01)

(52) U.S. Cl.
CPC ............... *F27B 9/00* (2013.01); *C21D 9/0056* (2013.01); *C21D 9/0068* (2013.01)

(58) Field of Classification Search
USPC .................................. 432/121, 122, 123, 125
See application file for complete search history.

(56) References Cited

U.S. PATENT DOCUMENTS

| | | | |
|---|---|---|---|
| 2007/0277911 A1 | 12/2007 | Baba et al. | |
| 2011/0174259 A1* | 7/2011 | Yoshimura | 123/188.2 |
| 2012/0228538 A1* | 9/2012 | Yoshimura | 251/366 |
| 2012/0304464 A1* | 12/2012 | Morii et al. | 29/888.45 |
| 2013/0019474 A1* | 1/2013 | Maruyama et al. | 29/888.45 |

FOREIGN PATENT DOCUMENTS

| | | |
|---|---|---|
| JP | 08-175635 A | 7/1996 |
| JP | 11-292244 A | 10/1999 |
| JP | 3560286 B2 | 9/2004 |
| WO | 2006/109540 A1 | 10/2006 |

OTHER PUBLICATIONS

International Search Report, dated Apr. 24, 2012, issued in corresponding application No. PCT/JP2012/050803.

* cited by examiner

*Primary Examiner* — Gregory A Wilson
(74) *Attorney, Agent, or Firm* — Westerman, Hattori, Daniels & Adrian, LLP

(57) ABSTRACT

An inventive automated heat treatment system has a furnace for heat treating forged engine valves, a carry-in mechanism for transporting the forged valves into the furnace, and a carry-out mechanism for transporting heat treated valves out of the furnace. Each of the carry-in mechanism and the carry-out mechanism has a retention mechanism for retaining valves hung, and a transport mechanism for transporting valves to the furnace as they are hung. The furnace has heating means, groups of paired rails for supporting and moving the valves hung in the furnace, and a stopper for controlling the positions of the valves on the rails. The engine valves are maintained hung with their umbrella-shaped portions supported by the respective mechanisms throughout the automated heat treatment processes. Thus, the heat treatment of engine valves is done in a fewer steps than in a conventional system.

4 Claims, 6 Drawing Sheets

AUTOMATED HEAT TREATMENT SYSTEM FOR ENGINE VALVE

TECHNICAL

Field of the Invention

This invention relates to an automated system of heat treating forged engine valves in a small number of steps without deforming the valves.

An apparatus for forging engine valves is disclosed in a Patent Document 1 listed below. The Patent Document 1 shows a system shown in FIG. 2 in which a stream of forged secondary work pieces (engine valves) 17 is carried by a cooling conveyer 40 and randomly collected in a work piece receiving box 18. In order to remove internal distortions created in the secondary work pieces 17 during forging, these work pieces are heat-treated before they are subjected to a subsequent process.

The heat treatment is done for the secondary work pieces 17 by first randomly moving them from the work piece receiving box 18 to a cage, and then placing the cage in a furnace for a predetermined period of time.

PRIOR ART DOCUMENT

Patent Document

Patent Document 1: JP3560286

SUMMARY OF THE INVENTION

Object of the Invention

Thus, the secondary work pieces randomly piled in the cage are heated unevenly in a furnace under the weight of randomly piled other work pieces. Consequently, in a conventional heat treatment, these secondary work pieces are deformed, so that a corrective measure is needed to remove the distortions. Provision of such tedious corrective measure is not preferable in the heat treatment of engine valves.

It is an object of the present invention to circumvent this problem by providing an automated heat treatment system capable of performing heat treatment of forged engine valves in a fewer steps without deforming the engine valves.

Means for Achieving the Object

An automated heat treatment system for an engine valve defined in claim 1 comprises a furnace for heat treating engine valves, a carry-in mechanism for carrying forged engine valves to the furnace, and a carry-out mechanism for carrying heat treated engine valves out of the furnace and transferring the valves to a next processing mechanism, the heat treatment system characterized in that:
   the carry-in mechanism includes
   a first retention mechanism for retaining a multiplicity of forged engine valves hung by supporting the umbrella-shaped portions of the valves, and
   a first transport mechanism for transporting the retained engine valves to the furnace;
   the furnace includes
   heating means for heating the engine valves,
   groups of paired rails with the paired rails spaced apart in parallel at a distance smaller than the diameter of the umbrella-shaped portions but larger than the diameter of the stem portions of the valves, the paired rails adapted to retain the engine valves hung by supporting the umbrella shaped portions, and paired rails movable in the longitudinal direction of the rails, and
   a stopper having at least one pawl which is movable in the longitudinal direction towards, and away from, the umbrella shaped portions of the valves, and
   the carry-out mechanism includes
   a second transport mechanism for retaining the engine valves hung by supporting the umbrella shaped portions and for carrying out from the furnace the heat treated engine valves as they are hung, and
   a second retention mechanism adapted to retain the engine valves hung by supporting the umbrella shaped portions of the valves carried out of the furnace.

The automated heat treatment system defined in claim 1 carries out heat treatment of the engine valves in the following steps:
   forged engine valves are retained hung with the umbrella-shaped portions of the engine valves supported by the first retention mechanism;
   the engine valves are transported from the first retention mechanism to the furnace by the first transport mechanism;
   the engine valves are heat treated as they are hung and moved across the furnace by the pawl of the stopper and movable rails;
   the heat treated valves are carried out of the furnace and moved to the second retention mechanism by the second transport mechanism.

(Function) The automated heat treatment system of claim 1 retains forged engine valves hung individually by supporting the umbrella-shaped portions of the engine valves without piling them in a cage, and transports them to a furnace for heat treatment. Thus, unlike conventional heat treating process, engine valves are not deformed nor indented by other neighboring valves during transportation. Since the heat treatment is given to the engine valves while they are hung, no thermal deformation nor bend will occur with the valves in the heat treatment.

The automated heat treatment system defined in claim 1 may be constructed, as defined in claim 2, such that:
   the first retention mechanism is configured in the form of a valve array retention mechanism adapted to retain a multiplicity of engine valves in a row at regular intervals
   each of the first and second transport mechanisms is adapted to support the lower surfaces of the umbrella portions of the engine valves arranged in a row; and
   the heat treatment furnace is provided with multiple groups of paired rails.

In the automated heat treatment system of claim 2, the valve array retention mechanism retains a multiplicity of forged engine valves hung in a row by supporting the umbrella portions of the engine valves. The first transport mechanism supports the lower surfaces of the engine valves while transporting the hung valves to the furnace. The valves carried in the furnace in a row are retained hung with their umbrella portions supported by the rails during heat treatment. After the heat treatment, the valves are removed from the furnace still hung in a row.

(Function) In the automated heat treatment system of claim 2, a multiplicity of forged engine valves are immediately hung in a row with the umbrella portions supported by the rails, and transported into a furnace for heat treatment and out of the furnace after the heat treatment as they are hung in a row. Accordingly, they are not deformed in the heat treatment, in contrast to the conventional heat treatment.

The rails in the furnace of the automated heat treatment system defined in claim 1 or 2 may be adapted to vertically retain the valves.

In a conventional heat treatment system, forged engine valves are randomly piled subjected to the weight of other valves during a heat treatment. Consequently, the heat treated engine valves are likely to be distorted in the heat treatment.

(Function) Each of the engine valves made in the automated heat treatment system of claim 3 is not distorted, since the valves are individually hung vertically and not subjected to forces of other valves. Consequently, each valve is free of any deformation or bend in the heat treatment.

Each of the first and second transport mechanisms defined in any one of claims 1 through 3 may comprise:

a pair of chuck hands made of a heat resistive metal and having openable and closable grippers and adapted to support the lower surfaces of the umbrella portions of all the engine valves; and a heat resistive forcing mechanism adapted to retain the engine valves in the upright position by forcing the upper most surfaces of the engine valves held level by the chuck hands, and the first and the second transport mechanisms comprise a first and a second movable grip-transport mechanism, respectively, for gripping and transporting engine valves.

(Function) The leading ends of the grippers of the chuck hands retain the engine valves vertically. This chuck hand mechanism can move together with the engine valves held by the grippers.

The chuck hands and the forcing mechanism of claim 4 can transport a multiplicity of highly heated engine valves immediately after forging to the furnace, and out of the furnace immediately after a heat treatment, while retaining the valves hung in a row.

Results of the Invention

Since the automated heat treatment system of claim 1 prevents deformations of engine valves in the process of transportation into a heat treatment furnace, retention during the heat treatment, and of removal from the furnace, the invention requires no process or redundant facilities for deformation correction process.

According to the automated heat treatment system of claim 1, heat treated engine valves can be removed from the furnace in an ordered condition, it is possible to conveniently transfer heat treated, yet incomplete, engine valves to a process that follows as needed, thereby improving the productivity of engine valves.

According to the automated heat treatment system of claim 2, ordinary deformation preventive processes and facilities are cut even when a plurality of engine valves are treated at a time.

According to the automated heat treatment system of claim 3, engine valves will not bend in the heat treatment, so that no bend correction measure or facility is needed.

According to the automated heat treatment system of claim 4, any additional deformation preventive processes and facilities are needed even when a plurality of engine valves are treated at a time. It should be appreciated that the number of steps of the heat treatment is greatly reduced in the inventive automated heat treatment system.

BEST MODE FOR CARRYING OUT THE INVENTION

Referring to FIGS. 1 through 6, the invention will now be described with reference to one embodiment of the invention. In what follows the front, rear, upper, lower, left, and right ends of an automated heat treatment system will be denoted by Fr, Re, Up, Dw, Le, and Ri in the respective figures.

Figure 1:
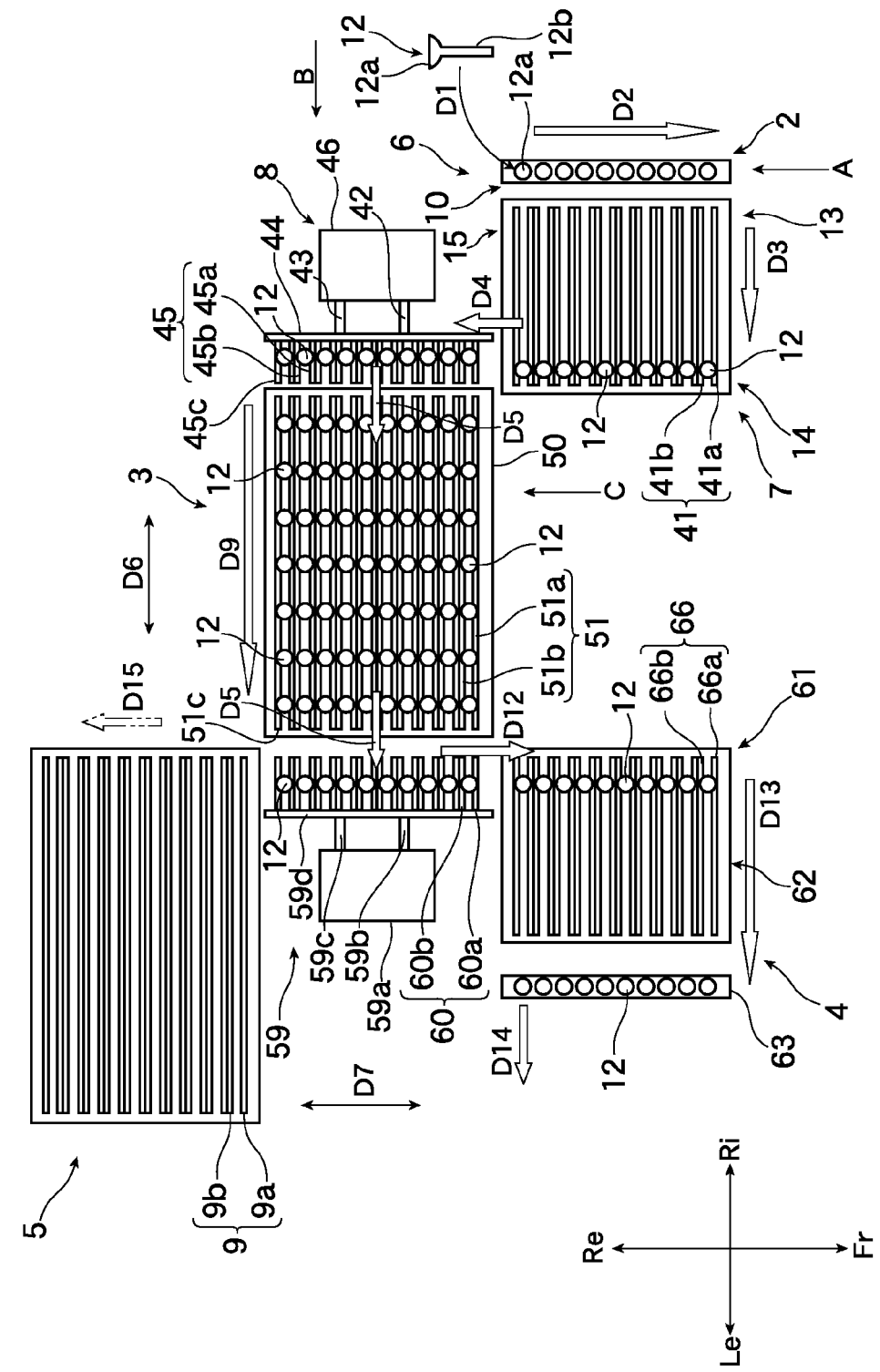
FIG. 1 is a plan view of an automated heat treatment system in accordance with an embodiment of the invention.

Referring to FIG. 1, there is shown an automated heat treatment system 1, which has a carry-in mechanism 2, a heat treatment furnace 3, a carry-out mechanism 4, and a stock section 5.

The carry-in mechanism 2 consists of a valve array retention mechanism 6 (first retention mechanism), a first transport mechanism 7, and a loading mechanism 8.

Figure 2:
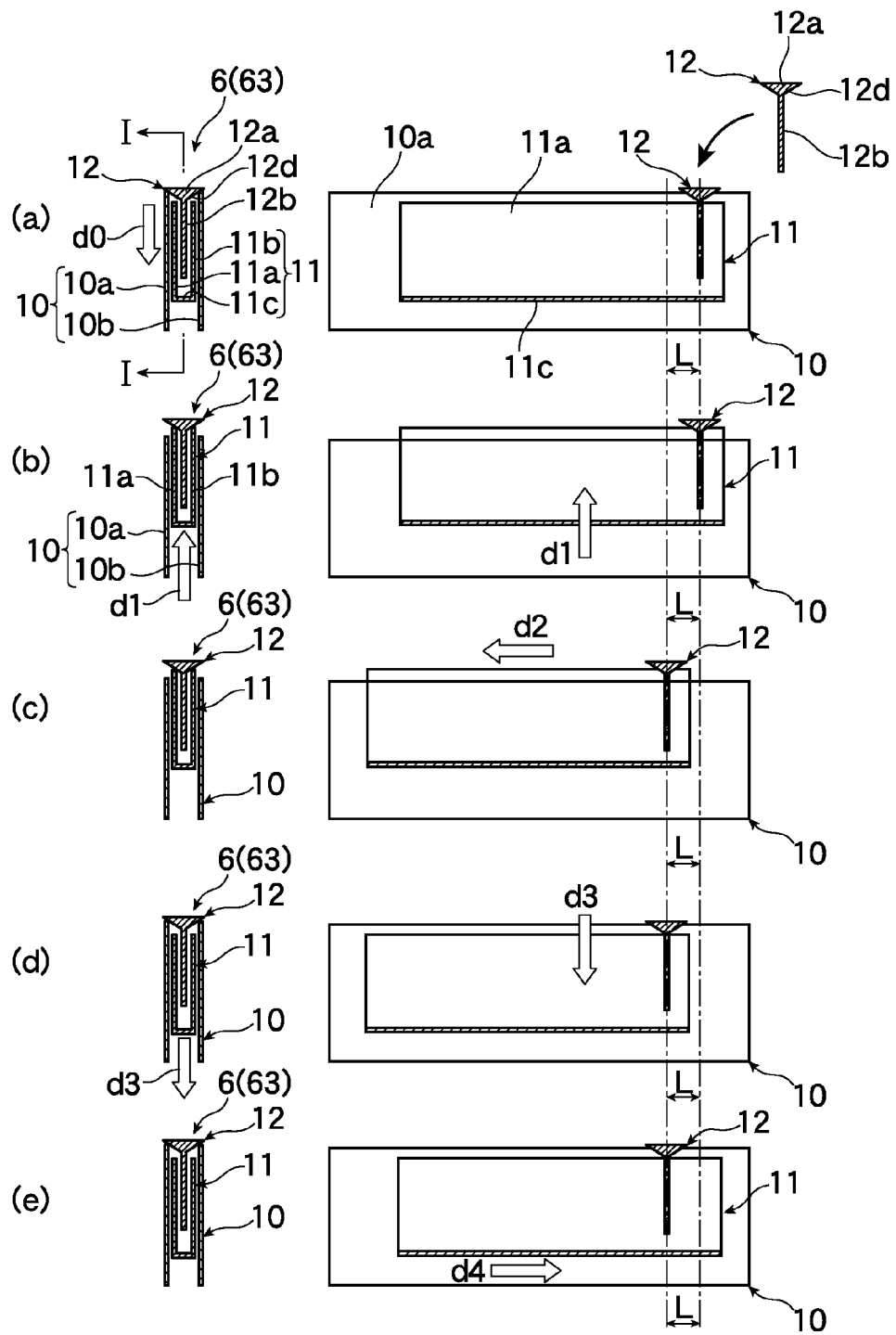
FIG. 2 shows cross sections of a valve array retention mechanism viewed in the direction of the arrow A in FIG. 1, taken along line I-I in FIG. 1, illustrating the operation of the valve array retention mechanism.

The valve array retention mechanism 6 of FIG. 1 consists of a retention platform 10 and a movable platform 11, as shown in FIG. 2. Shown on the left side of FIG. 2 are side views of the carry-in mechanism 2 shown in FIG. 1, as seen in the direction of arrow A. Shown on the right side of FIG. 2 are cross sections of the same mechanism 2 taken along line I-I in the respective left side views. The retention platform 10 has a pair of retention walls 10a and 10b extending in the front-back direction in FIG. 1. The paired retention walls 10a-10b are arranged in parallel to each other spaced apart by a distance smaller than the outer diameter of the umbrella portions (fillet sections) 12a of the forged engine valves 12. The movable platform 11 consists of a pair of upright walls 11a-11b and a bottom plate 11c integrally connecting the upright walls 11a-11b. The upright walls 11a-11b are arranged inside the paired parallel retention walls 10a-10b. The movable platform 11 can be moved by a drive mechanism (not shown) in the vertical and in the front-back directions as well. The engine valves 12 held on the retention platform 10 are moved forward (in the direction of arrow D2 in FIG. 1) in the following steps.

First, the forged engine valves 12 are moved onto one end of the retention walls 10a-10b in the direction of arrow d0 by a robot arm (not shown) for example such that their lower surfaces 12d of the umbrella portions are supported by the retention walls 10a-10b of the retention platform 10 and their stem portions 12b hanging downward. Next, the platform 11 is lifted upward (in the direction of arrow d1) so that the upright walls 11a-11b of the platform 11 lift them up from the retention platform 10 as shown in FIG. 2(*b*).

Then the lifted platform 11 is moved forward by a distance L (in the direction of arrow d2) while retaining the engine valves 12 on the upright walls 11a-11b, as shown in FIG. 2(*c*), and the movable platform 11 is lowered (in the direction of arrow d3). Thus, the engine valves 12 are displaced to a forward position on the retention platform 10 by the distance L from the initial position shown in FIG. 2(*a*). Subsequently, as shown in FIG. 2(*e*), the platform 11 is retracted (in the direction of arrow d4) to the initial position shown in FIG.

2(a). By repeating the steps shown in FIGS. 2(a) through FIG. 2(e), the engine valves 12 are lined up in a row on the retention platform 10, spaced apart at regular intervals L in the front-back direction. In the example shown herein, ten engine valves 12 are lined up in one row.

The engine valves 12, lined up in one row on the retention platform 10, are transported by the first transport mechanism 7 to the loading mechanism 8. The first transport mechanism 7 has a cooling mechanism 14 arranged adjacent the retention platform 10, a first grip-transport mechanism 13 arranged between the retention platform 10 and the cooling mechanism 14, and a second grip-transport mechanism 15 between the cooling mechanism 14 and the loading mechanism 8.

Figure 3:
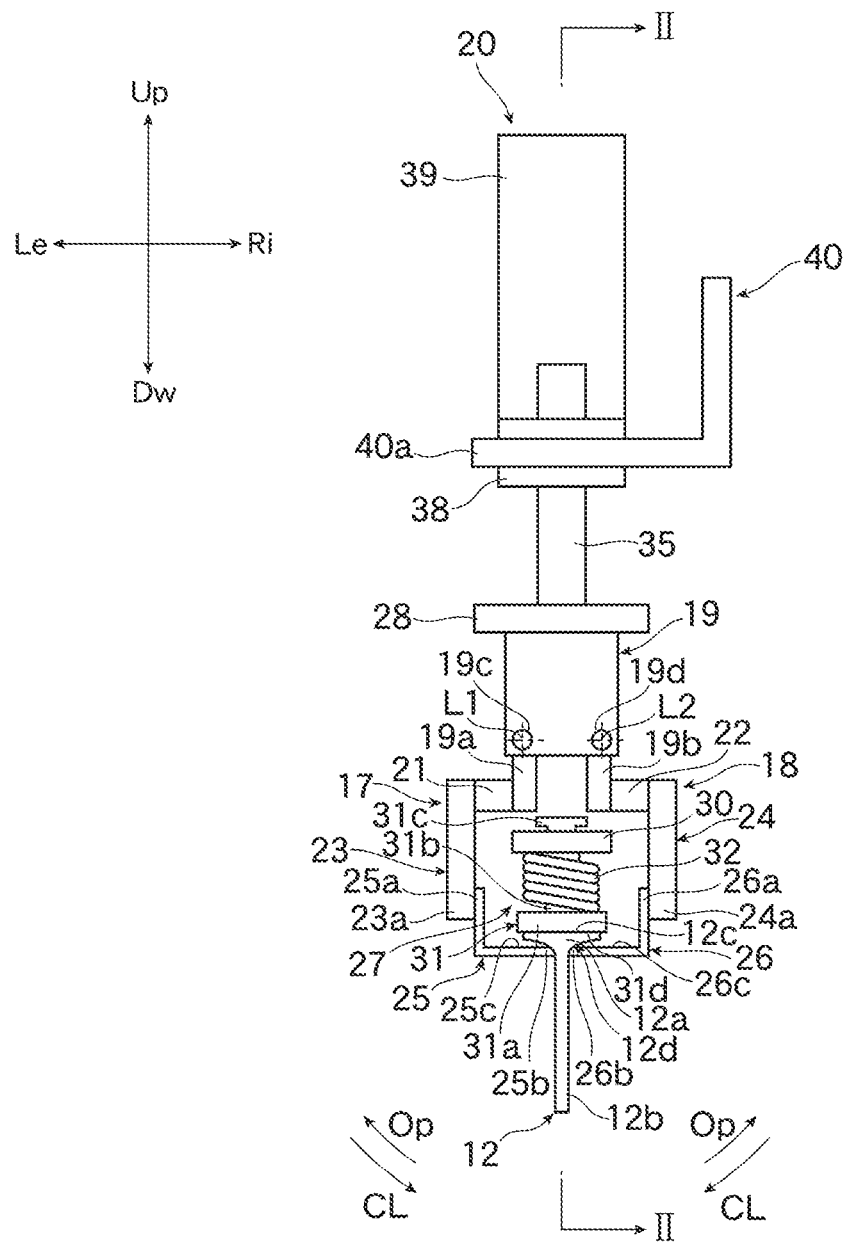
FIG. 3 is a front view of a first and a second transport mechanism.
Figure 4:
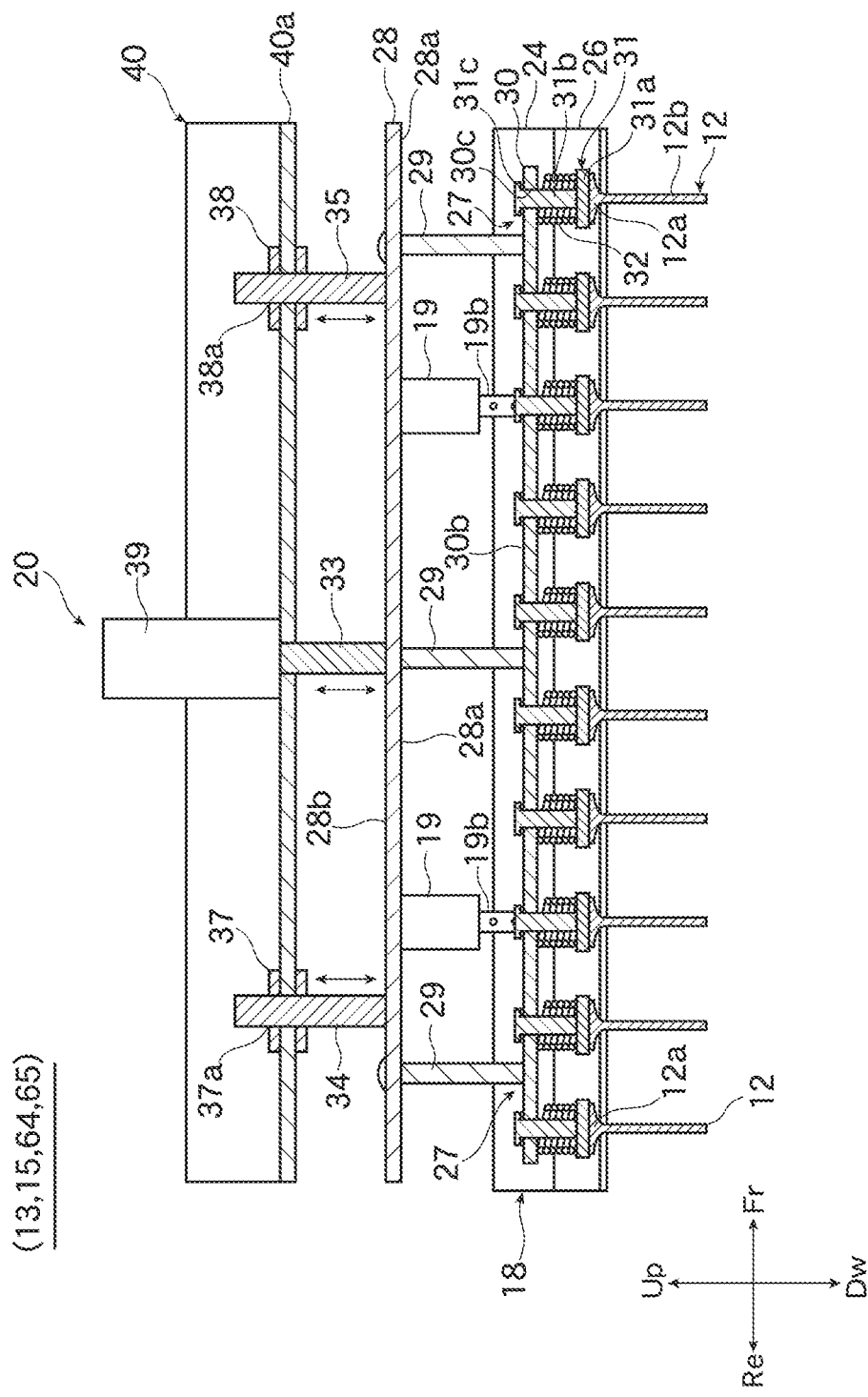
FIG. 4 is a cross section taken along line II-II in FIG. 3.

A first and a second grip-transport mechanism 13 and the 15, respectively, have a common structure as shown in FIGS. 3 and 4. Each of the first and second grip-transport mechanisms 13 and 15 has a pair of chuck hands 17 and 18, a multiplicity of drive mechanisms 19, and a cylinder mechanism 20. The paired chuck hands 17 and 18 have a symmetric right and left connector sections 21 and 22, arms 23 and 24, grippers 25 and 26, and forcing mechanism 27. (For the sake of illustration, screws 29 for fixing the forcing mechanism 27 are not shown in FIG. 3.) The right and left connector sections 21 and 22, the arms 23 and 24, and the grippers 25 and 26 are made of metals. Especially the grippers 25 and 26 are made of a highly heat resistive steel such as a stainless steel.

The drive mechanism 19 has supporting posts 19a and 19b, which can be hydraulically swung by drive shafts 19c and 19d about their rotational axes L1 and L2. The arms 23 and 24 are each long slab-shaped members extending in the front-back direction and having wide upward and downward surfaces. These arms 23 and 24 are integrated with supporting posts 19a and 19b via the right and left connector sections 21 and 22. The grippers 25 and 26 are each made of a flexible metal plate with their lower end inwardly inflexed, and securely fixed to the lower ends 23a and 24a of the arms 23 and 24, respectively, by welding the upper ends 25a and 26a to the lower ends 23a and 24a of the arms 23 and 24. When the drive mechanism 19 is in operation, the chuck hands 17 and 18 are swung, together with the supporting posts 19a and 19b, about the rotational axes L1 and L2 of the supporting posts 19a and 19b in the opening direction Op and closing direction CL shown in FIG. 3.

The multiple drive mechanism 19 are securely fixed to the lower surface 28a of an upper plate 28 that extends in the front-back direction. The forcing mechanism 27 consists of screws 29, a lower plate 30, bottomed shaft members 31, and compression coil springs 32. The lower plate 30 is integrated with the lower surface 28a of the upper plate 28 via the screws 29, which are in turn integrated with an upper surface 30b of the lower plate 30.

Each of the bottomed shaft members 31 (ten bottomed shaft members in total in the example shown herein) consist of a shaft 31b having a flanged base section 31c and a bottom plate 31a integrated with the shaft 31b with screws (not shown). The shaft 31b, inserted from above into one of holes 30c formed in the lower plate 30, is movable in the vertical direction. A compression coil spring 32 surrounds the shaft 31b. The bottom plate 31a is securely fixed to the shaft 31b. As the bottom plate 31a is brought into contact with the upper surfaces 12c of umbrella portions, the compression coil springs 32 urge the upper surfaces 12c of the umbrella portions 12a against the horizontal bottom plate 31a.

The cylinder mechanism 20 consists of a cylinder 39 having a cylinder rod 33, guides 37 and 38 formed with holes 37a and 38a through which guide rods 34 and 35 are movably passed, and the upper plate 28. The cylinder rod 33 and the guide rods 34 and 35 are securely fixed to the upper surface 28b of the upper plate 28. The cylinder 39 and the guides 37 and 38 are securely fixed to the horizontal surface 40a of an L-shaped fixed plate 40 arranged above the upper plate 28. The grip-transport mechanism 13 can be moved in a horizontal direction (to the right and left in FIG. 4) by the fixed plate 40. The grip-transport mechanism 15 can be vertically moved by the fixed plate 40.

The cylinder rod 33 can be advanced and retracted in the vertical direction by means of the cylinder 39 driven by, for example, a hydraulic mechanism. In response to the movement of the cylinder rod 33, the guide rods 34 and 35 move up and down through the holes 37a and 38a of the guides 37 and 38, respectively, thereby facilitating the cylinder rod 33 to move in the vertical direction. The chuck hands 17 and 18 and the drive mechanism 19 can be moved together by the cylinder 39 in the vertical direction.

The chuck hands 17 and 18 can be opened in the directions of arrows Op, and moved downward towards the engine valves 12 by the drive mechanism 19 and cylinder 39. When lowered to the level of the umbrella portions of the engine valves 12, the chuck hands 17 and 18 are closed inward (in the directions of arrows CL) by the drive mechanism 19.

The multiple forged engine valves 12 (ten valves in total in the example shown herein) are lined up in a row on the retention platform 10 by the leading ends 25b and 26b which support the lower surfaces 12d of the umbrella portions of the valves 12 with the stem portions 12b located between the grippers 25 and 26. Supported by the grippers 25 and 26, the umbrella portions 12a projects upward from the grippers 25 and 26 and touch the bottomed shaft members 31. Under this condition, the upper surfaces 12c of the umbrella portions 12a are pressed against the horizontal lower surfaces 31 of the bottom plates 31a, so that each of the engine valves 12 is securely fixed to the grippers 25 and 26 with its stem portion 12b aligned with a vertical line.

The grip-transport mechanism 13 transports the engine valves 12 to the left cooling mechanism 14 (in the direction of arrow D3 in FIG. 1) as they are lined up in a low on the retention platform 10. The cooling mechanism 14 has a cooling jacket (not shown) and groups 41 of paired rails 41a and 41b (10 sets of twenty rails in the example shown herein). One pair of rails 41a and 41b are arranged in parallel to each other spaced apart at a distance wider than the outer diameter of the stem portion 12b of the engine valve 12, but narrower than the outer diameter of the umbrella portion 12a. The groups 41 are arranged at regular intervals. The row of engine valves 12 are inserted in between paired rails 41a and 41b as shown in FIG. 1, by the grip-transport mechanism 13 with the umbrella portions 12a supported by the respective rails 41. The engine valves 12 on the set 41 of paired rails are cooled by the cooling jacket, and then transported (in the direction indicated by arrow D4) to the downstream loading mechanism 8 by the second grip-transport mechanism 15.

The loading mechanism 8 has a pair of cylinder rods 42 and 43 driven by a cylinder mechanism 46 (in the form of a hydraulic mechanism, for example) in the horizontal direction; a base member 44 integral with the left ends of the cylinder rods 42 and 43 and extending in the front-back direction; groups 45 of auxiliary rails integrated with the left end of the base members 44. Each group of auxiliary rails 45 has a pair of rails 45a and 45b. In this embodiment, there are ten groups of paired auxiliary rails 45a and 45b, totaling twenty rails provided for the base member 44. The base member 44 and the ten groups 45 of paired auxiliary rails are moved together by the cylinder rods in the horizontal direction. The auxiliary rails 45a-45b of each pair are arranged in parallel to each other spaced apart at a distance larger than the outer diameter of the stem portion 12b of the engine valve 12 but smaller than the outer diameter of the umbrella portion 12a. The groups of pairs 45 are arranged at regular intervals (pitches). The engine valves 12 transported by the second grip-transport mechanism 15 are disposed between the respective auxiliary rail pairs 45b-45b which support the umbrella portions 12a of the valves 12.

The row of the engine valves 12 arranged on the respective auxiliary rail pairs 45 are moved (in the direction of arrow D5) to the leftward heat treatment furnace 3 together with the auxiliary rail groups by the cylinder mechanism 46. The loading mechanism 8 is provided with a push mechanism 47 (FIG. 6(a)) for pushing the stem portions 12b lying on the auxiliary rail groups 45 to the left and out of the auxiliary rails from the left ends 45c thereof. The push mechanism 47 has a pair of support rods 44a integral with the base member 44, a drive shaft 48 that is mounted on the support rods 44a swingably about a rotational axis L3 (extending in the front-back direction), and an arm 49 mounted on the drive shaft 48. The arm 49 is mounted on a pair of support rods 49a in parallel with the rotational axis L3. When rotated in the counterclockwise direction in FIG. 6(a), the arm 49 comes into contact with the stem portions 12b of the engine valves 12 on the groups of auxiliary rails, pushing the engine valves 12 leftward and finally out from the left end 45c (in the direction of arrow D5).

Arranged slightly below the left ends 45c of the auxiliary rails that have moved to the far left are groups 51 of paired rails 51a and 51b in association with the paired auxiliary rails 45a and 45b. In the example shown herein, there are ten groups of twenty rails. The groups of rails 51 belong to the heat treatment furnace 3.

+++
The paired rails 51a and 51b have the identical diameter and the length. The paired rails 51a and 51b are spaced apart at a distance larger than the outer diameter of the stem portions 12b of the engine valves 12 but smaller than the outer diameter of the umbrella portions 12a. The groups 51 are disposed at regular intervals.

One row of the engine valves 12 pushed out of the auxiliary rails by the push mechanism 47 are transferred onto and between the associated pair of rails 51a and 51b with their umbrella portions 12a supported by the paired rails retain the valves vertically.

Figure 5:
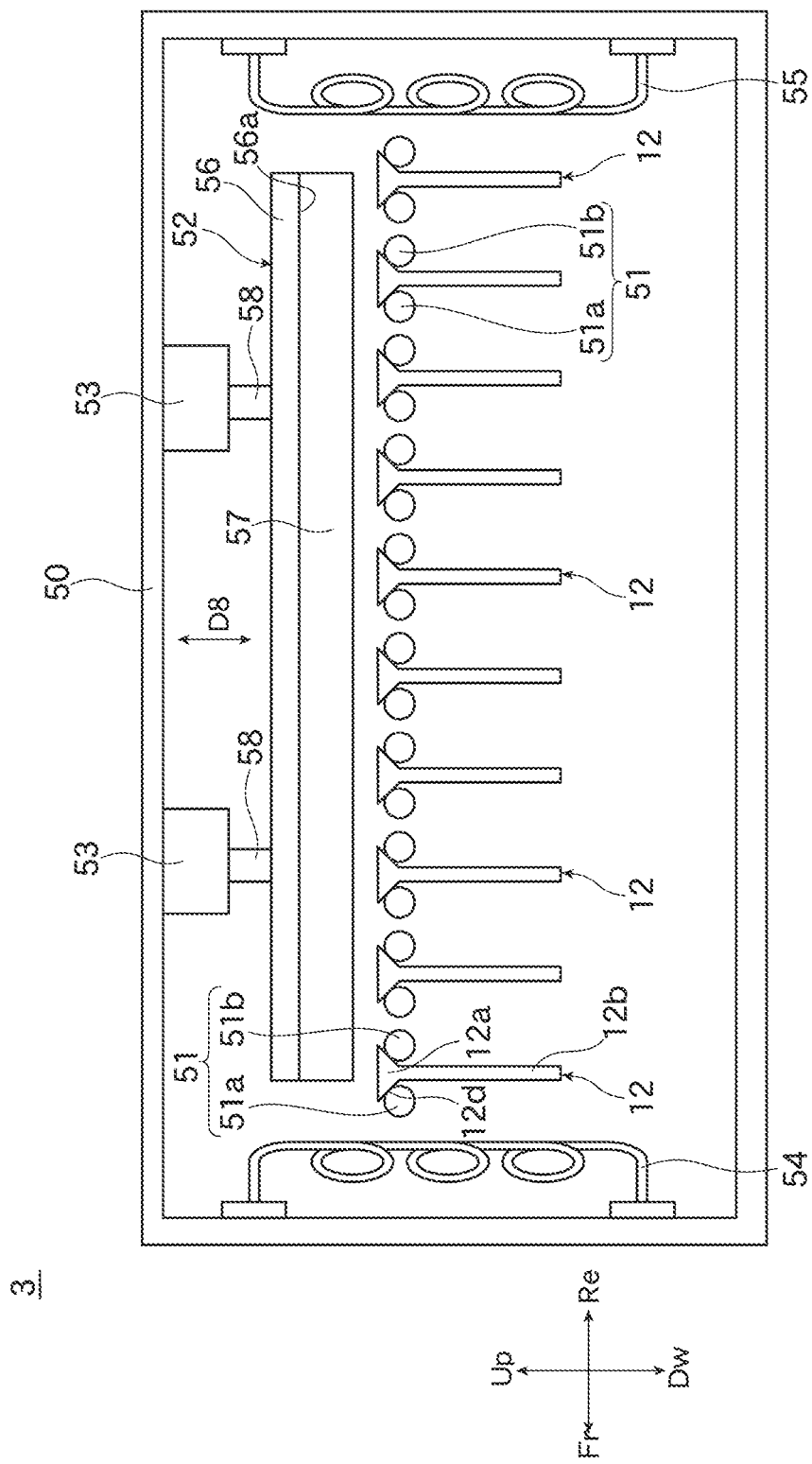
FIG. 5 is an internal view of a heat treatment furnace viewed in the direction of arrow B in FIG. 1.

Next, referring to FIGS. 3 and 5, there is shown in detail the heat treatment furnace 3. The heat treatment furnace 3 has a stopper 52, cylinder mechanisms 53, and heaters 54 and 55 along with a multiplicity of rails 51 (hereinafter simply referred to as rails 51), all accommodated in a body 50. The paired rails 51a and 51b can move in their longitudinal direction D6. In this embodiment, each pair of rails 51a and 51b have a length sufficient to retain 7 engine valves 12, and the furnace 3 can heat 10 rows of valves, totaling seventy forged engine valves 12 at a time.

On the other hand, the stopper 52 is suspended from a cylinder rod 58 of multiple (4 in this example) cylinder mechanisms 53 above the rails 51. The stopper 52 has a multiplicity of slab-shaped pawls 57 (seven pawls in this embodiment) extending in the same front-back direction D7 in FIG. 1 as the ceiling plate 56. The pawls 57 are spaced apart at regular intervals and integrated with the lower surface 56a of the ceiling plate 56. Each cylinder rod 58 can be moved in the vertical direction (that is, in the direction of arrow D8 in FIG. 5) towards the rails 51 by the cylinder mechanism 53, together with the stopper 52.

Figure 6:
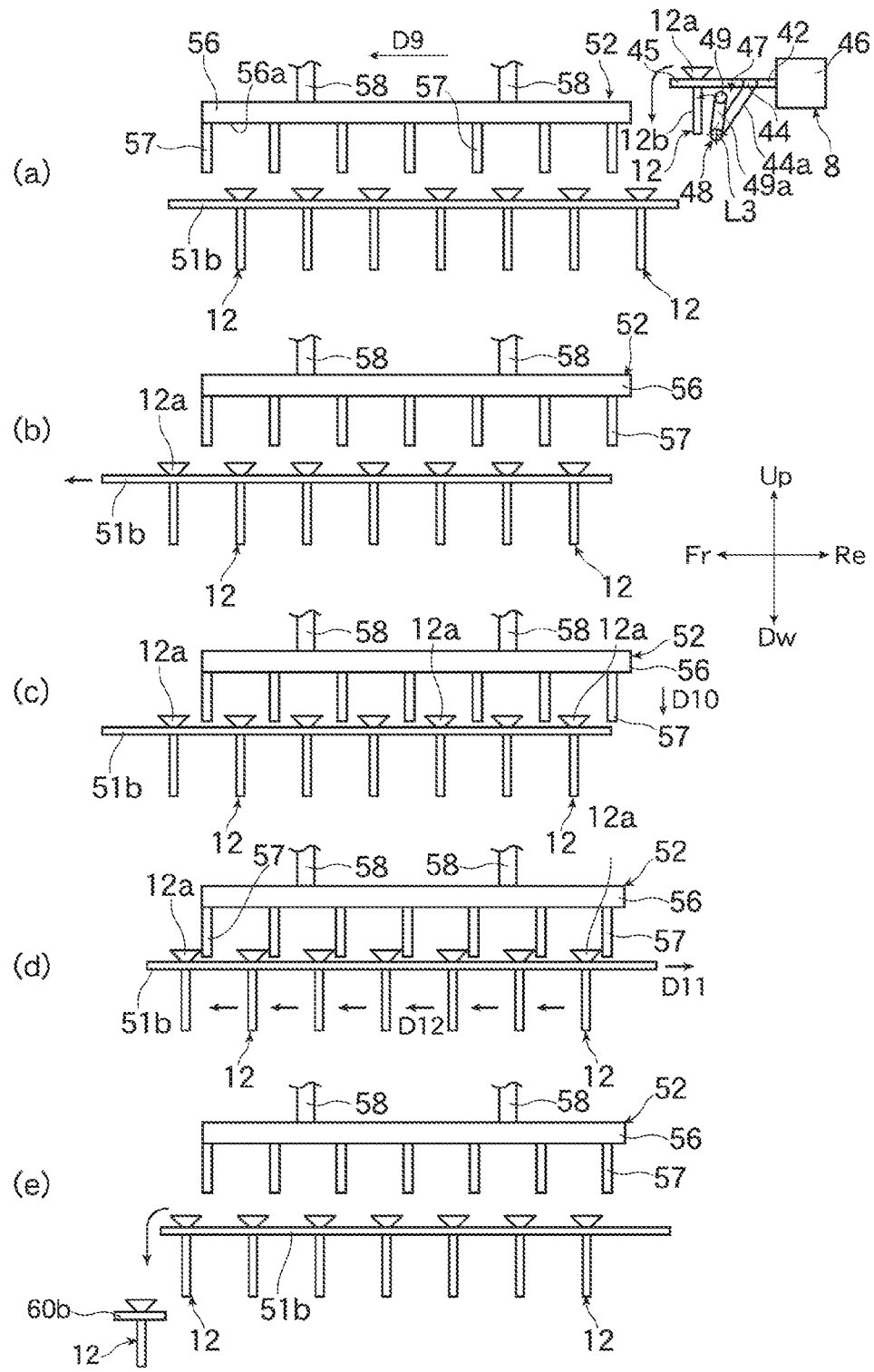
FIG. 6 is a diagram showing how forged engine valves are moved in the heat treatment furnace, viewed from the direction of arrow C in FIG. 1.

FIG. 6 illustrates steps of heat treatment in the furnace 3, in which the engine valves 12 disposed on the rails 51 are heated by the heaters 53 and 54 while moving in the left direction of arrow D9 as shown in FIGS. 1 and 6, in the sequence as shown in FIG. 6(a)-(e).

Referring to FIG. 6(a)-(e), means for sliding the engine valves 12 on the rails 51 will be described in detail. FIG. 6(a) shows the initial positions of the rails 51 carrying thereon engine valves 12 and the stopper 52 at their initial positions, where the rails 51 carry a column of 10 forged valves placed in sequence from the right end of the rails by the loading mechanism 8. In the next step, as shown in FIG. 6(b), the rails 51 are moved leftward until the pawls 57 are located at upper right positions relative to the associated engine valves 12 carried on the rails. Then, the cylinder mechanism 53 is actuated to lower the stopper 52 so as to position the pawls 57 to the right of the respective umbrella portions 12a of the respective engine valves 12, as shown in FIG. 6(c). Next, the rails 51, carrying the valves 12, are moved in the right direction D11. This movement of the rails 51 brings the engine valves 12 into contact with the respective pawls 57 and causes the engine valves 12 to be shifted to the left by one pitch relative to the rails 51, as shown in FIG. 6(d).

The engine valves 12 arranged in 10 rows on the rails 51 are repetitively shifted leftward while they are heat treated in the furnace 3 without touching other valves, or without being deformed.

Those engine valves 12 shifted to the left end 51c of the rails 51 are pushed leftward (D5 direction) toward the carry-out mechanism 4 as shown in FIG. 6(e).

The carry-out mechanism 4 has an auxiliary valve retention mechanism 59, a second transport mechanism 61, and a second valve retention mechanism (or valve array retention mechanism) 63.

The auxiliary valve retention mechanism 59 has a pair of cylinder rods 59b and 59c driven in the horizontal direction by a cylinder mechanism 59a in the form of a hydraulic mechanism, for example, a base member 59d extending in the front-back direction and integral with the right ends of the cylinder rods 59b and 59c, and a multiplicity of auxiliary rails 60 (hereinafter referred to as auxiliary rails 60) integrated with the right end of the base members 59d. The auxiliary rails 60 are divided into groups of paired rails 60a and 60b, the groups disposed at regular intervals (pitches). The base member 59d of the present embodiment includes ten groups of twenty paired auxiliary rails 60a-60b. The paired auxiliary rails 60a-60b are spaced apart in parallel to each other at a distance wider than the outer diameter of the stem portion 12b of the engine valves 12, but narrower than the outer diameter of the umbrella portions 12a. The base member 59d and twenty groups 60 of auxiliary rails move together with the cylinder rods 59b-59c in the horizontal direction.

Each pair of auxiliary rails 60a-60b are arranged slightly below the rails 51a and 51b. The engine valves 12 pushed out of the left ends left end 51c of the paired rails 51a and 51b are transferred ont the paired rails 60a-60b via the respective umbrella portions 12a. The auxiliary rail groups 60 carrying the engine valves 12 are moved to the left by the cylinder mechanism 59a, and out of the heat treatment furnace 3.

The second transport mechanism 61 has a cooling system 62, a third grip-transport mechanism 64, and a fourth grip-transport mechanism 65. The third and fourth grip-transport mechanisms 64 and 65, respectively, are of the same structure of the first and second grip-transport mechanisms. The cooling system 62 and the stock section 5 are arranged in front and behind the 59, respectively, while the valve array retention mechanism 63 is arranged adjacent the cooling system 62 as shown in FIG. 1 The cooling system 62 has multiple groups 66 of paired rails 66a-66b (ten groups of twenty rails in the present embodiment, and a cooling jacket (not shown). The third grip-transport mechanism 64 is movable in the front-back direction between the auxiliary valve retention mechanism 59 and the cooling system 62, or between the auxiliary valve retention mechanism 59 and the stock section 5. The carry-out mechanism 4 is movable in the horizontal direction between the cooling system 62 and the valve array retention mechanism 63.

The umbrella portions 12a of the engine valves 12 arranged in a row by the auxiliary valve retention mechanism 59 are held by the third grip-transport mechanism 64, and transported from the auxiliary valve retention mechanism 59 to the cooling system 62 (in the direction indicated by D12). The stem portions 12b of the engine valves 12 are inserted between the paired rails 66a-66b as shown in FIG. 1, with their umbrella portions 12a held by the rail groups 66. After cooled by the cooling jacket, the engine valves 12 lined up in a row on the rail groups 66, are transported by the fourth grip-transport mechanism 65 in the direction of arrow D13 towards the valve array retention mechanism 63 with their umbrella portions 12a still supported by the fourth grip-transport mechanism 65.

The valve array retention mechanism (second valve retention mechanism) 63 has the same structure as the valve array retention mechanism 6 of the carry-in mechanism 2. The engine valves 12 transported by the fourth grip-transport mechanism 65 are placed on the paired retention walls 10a-10b in a row with their umbrella portions 12a resting on the retention walls 10a-10b. The valve array retention mechanism 63 moves the engine valves 12 in the opposite direction as compared with the valve array retention mechanism 6 of the carry-in mechanism 2 that moves forward the engine valves 12 on the paired retention walls 10a-10b by a distance L in each step. That is, the valve array retention mechanism 63 moves the engine valves 12 backward by a distance L in every step by the movable platform 11 while retaining the valves 12 on the retention walls 10a-10b lined up in a row. When the engine valves 12 is moved to the rear most end of the retention walls 10a and 10b, they are transferred one at a time to the next step by a robotic arm (not shown) (in the direction D14).

It is noted that in the event when the valve manufacturing facility is stopped, the valves 12 left on the auxiliary valve retention mechanism 59 are transferred to the stock section 5 (as indicated by arrow D15) by a third grip-transport mechanism 64. The stock section 5 has groups 9 of paired rails 9a-9b (ten groups of paired rails, totaling twenty rails in the present example).

LIST OF REFERENCE NUMERALS 1 automated heat treatment system for engine valve
2 carry-in mechanism
3 heat treatment furnace
4 carry-out mechanism
6 valve array retention mechanism
7 first transport mechanism
12 engine valves
12a umbrella portions
12b stem portion
12d lower surfaces
13, 15 grip-transport mechanisms
17, 18 chuck hands
25, 26 grips of chuck hand
25b, 26 leading ends of grippers
25c, 26c upper surfaces of leading ends of grippers
27 forcing mechanism
51 groups of rails
52 stopper
57 pawls
61 second transport mechanism
63 valve array retention mechanism (second retention mechanism
64, 65 grip-transport mechanisms

The invention claimed is:

1. An automated heat treatment system for an engine valve having; a furnace for heat treating engine valves, a carry-in mechanism for carrying forged engine valves into the furnace, and a carry-out mechanism for carrying heat treated engine valves out of the furnace and transferring the valves to a next processing mechanism, the heat treatment system characterized in that:
the carry-in mechanism includes
a first retention mechanism for retaining a multiplicity of forged engine valves hung by supporting the umbrella-shaped portions of the valves, and
a first transport mechanism for transporting the retained engine valves to the furnace;
the furnace includes
heating means for heating the engine valves,
groups of paired rails with the pair rails spaced apart in parallel at a distance smaller than the diameter of the umbrella-shaped portions but larger than the diameter of the stem portions of the valves, the paired rails adapted to retain the engine valves hung by supporting the umbrella shaped portions and movable in the longitudinal direction of the rails, and
a stopper having at least one pawl which is movable in the longitudinal direction towards, and away from, the umbrella shaped portions of the valves, and
the carry-out mechanism includes
a second transport mechanism for retaining the engine valves hung by supporting the umbrella shaped portions and for carrying out from the furnace the heat treated engine valves as they are hung, and
a second retention mechanism adapted to retain the engine valves hung by supporting the umbrella shaped portions of the valves carried out of the furnace.

2. The automated heat treatment system according to claim 1, wherein
the first retention mechanism is configured in the form of a valve array retention mechanism adapted to retain a multiplicity of engine valves in a row at regular intervals;
each of the first and second transport mechanisms is adapted to support the lower surfaces of the umbrella portions of the engine valves arranged in a row; and
the heat treatment furnace is provided with multiple groups of rails.

3. The automated heat treatment system according to claim 1, wherein the multiple groups of rails are adapted to vertically retain the engine valves.

4. The automated heat treatment system according to claim 1, wherein each of the first and second transport mechanisms comprise:
a pair of chuck hands made of a heat resisting metal and having openable and closable grippers and adapted to support the lower surfaces of the umbrella portions of all the engine valves;

a heat resistive forcing mechanism adapted to retain the engine valves vertically by forcing the upper most surfaces of the engine valves horizontally with the chuck hands, and a movable grip-transport mechanism for gripping and transporting engine valves.

\* \* \* \* \*